UNITED STATES PATENT OFFICE.

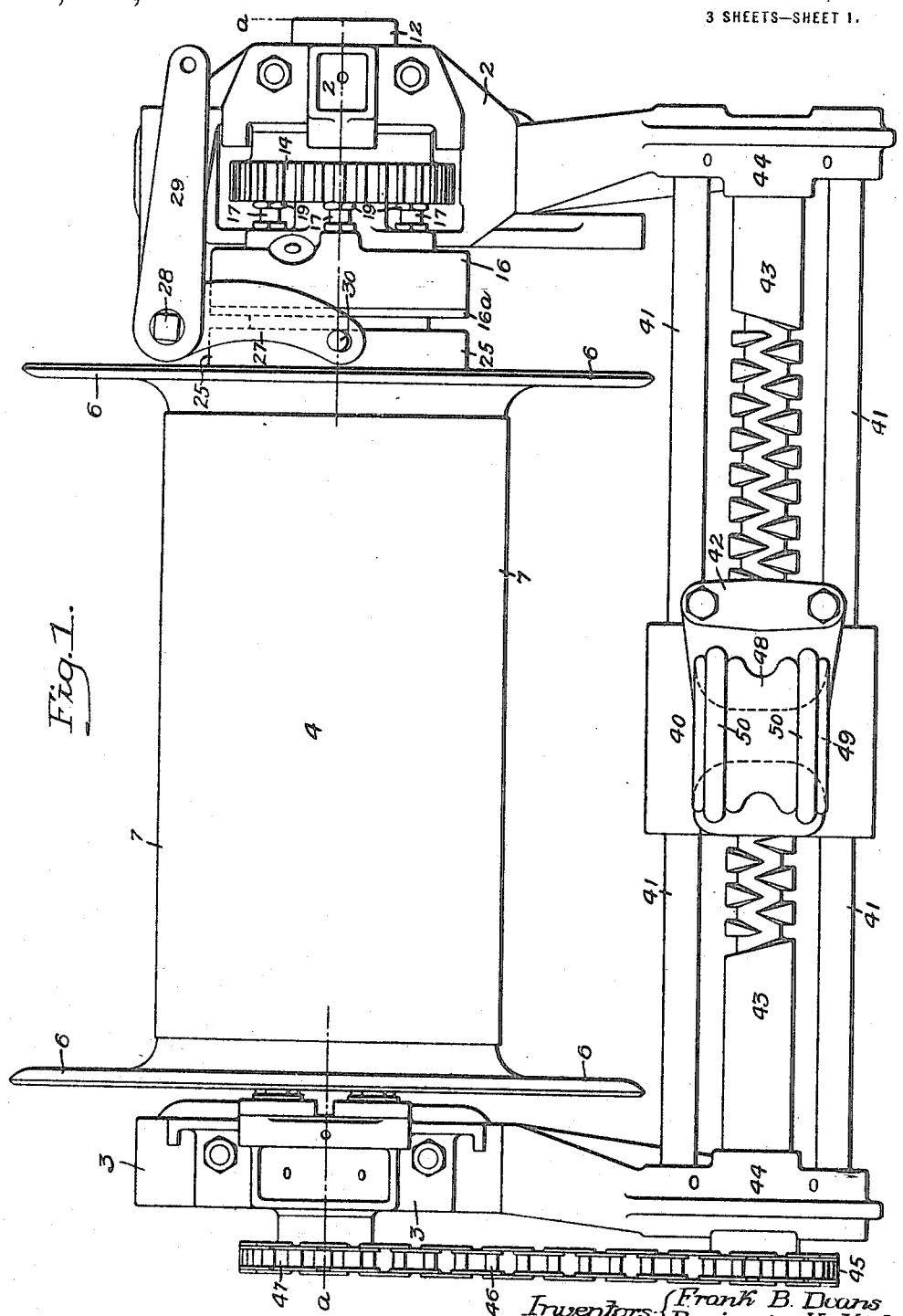

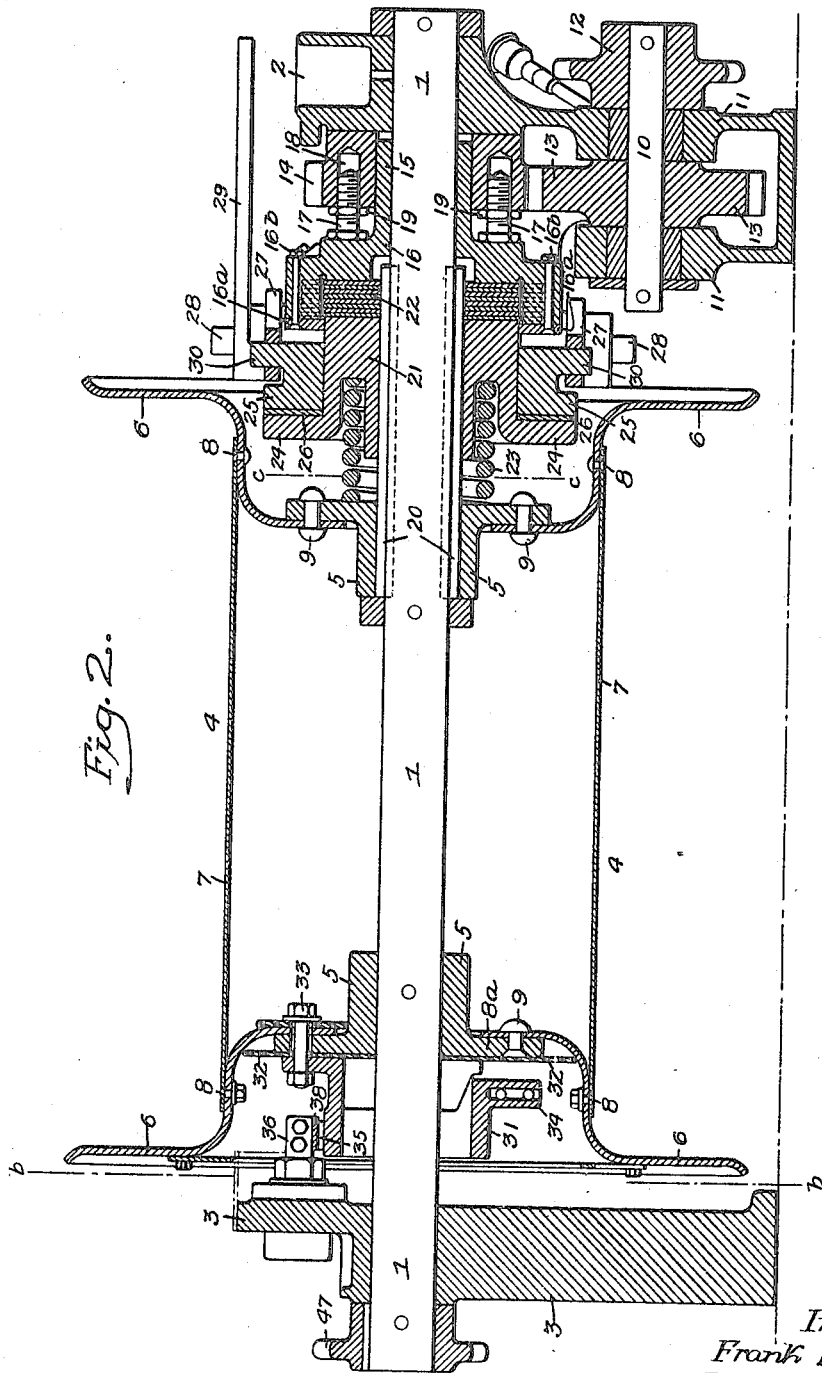

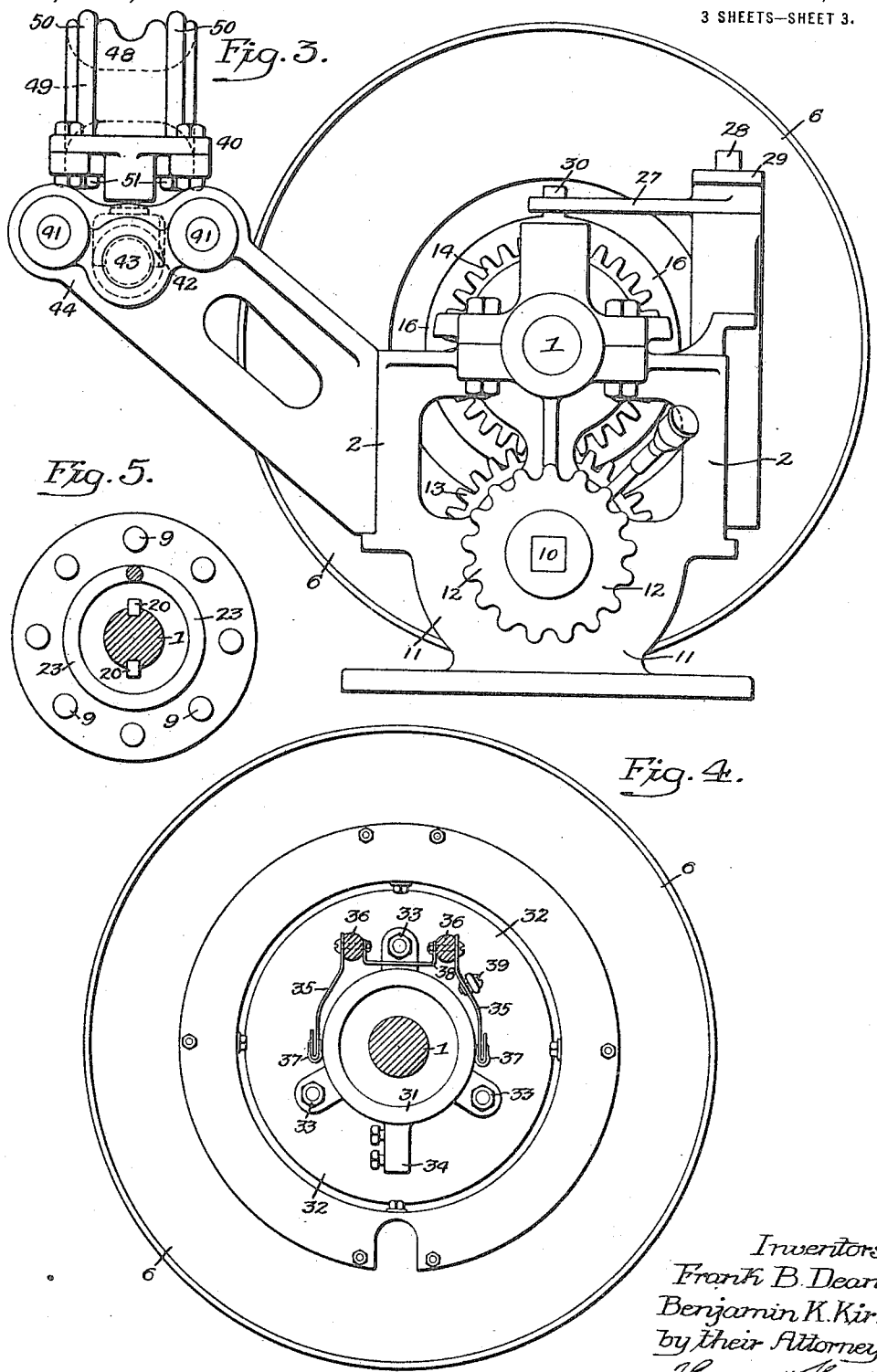

FRANK B. DEANS, OF SHARON HILL, AND BENJAMIN K. KIRK, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

CLUTCH AND BRAKE MECHANISM IN REELS FOR MINE-LOCOMOTIVES.

1,208,511.     Specification of Letters Patent.     Patented Dec. 12, 1916.

Application filed December 29, 1915. Serial No. 69,254.

*To all whom it may concern:*

Be it known that we, FRANK B. DEANS and BENJAMIN K. KIRK, citizens of the United States, and residents of Sharon Hill, county of Delaware, State of Pennsylvania, and Philadelphia, county of Philadelphia, State of Pennsylvania, respectively, have invented certain Improvements in Clutch and Brake Mechanism in Reels for Mine-Locomotives, of which the following is a specification.

This invention relates to certain improvements in the reels for the conducting wire or cord of an electric mine locomotive, whereby the locomotive can be traversed through galleries which are not provided with an electric equipment.

The object of our invention is to simplify the construction of a reel of this type and to provide means whereby a friction brake is applied when the clutch is released so as to prevent undue slack occurring in the cord when it is paid out. This object we attain in the following manner, reference being had to the accompanying drawings in which:

Figure 1 is a plan view of our improved reel; Fig. 2 is a longitudinal sectional view on the line $a$—$a$, Fig. 1; Fig. 3 is an end view; Fig. 4 is a transverse sectional view on the line $b$—$b$, Fig. 2; and Fig. 5 is a transverse sectional view on the line $c$—$c$, Fig. 2.

Referring to the drawings, 1 is the main shaft mounted in bearings 2 and 3 of any suitable type. These bearings are secured to the body of the electric locomotive and secured to the shaft is the drum 4 on which the electric conductor is wound. This drum, in the present instance, is made as follows: Each head of the drum consists of a hub 5 and a pressed sheet metal head 6 having a deep depression at the center, the walls of this depression forming a support for the cylindrical body portion 7 to which it is secured by bolts 8. The inner portion of the head is secured to the flange $8^a$ of the hub by rivets 9, making an exceedingly substantial yet light structure, which is also compact owing to the fact that parts of the mechanism can be located within the depressed portion of the head.

10 is the shaft through which the drum is driven. This shaft is mounted in bearings 11 in the main bearing structure 2. On the shaft 10 is a sprocket wheel 12 around which passes the drive chain from any suitable shaft on the locomotive. Located between the bearings 11 on the shaft 10 is a gear wheel 13 which meshes with a pinion 14 in the shape of a ring, which is keyed to the hub 15 of one of the jaws of the friction clutch 16. The hub 15 is loose on the shaft 1 but it is free to be adjusted longitudinally thereon by means of the stud bolts 17 which enter the openings 18 in the pinion 14, and on these bolts are nuts 19. The pinion 14 rests against the bearing 2, as shown in Fig. 2, so that, on turning the nuts, the clutch member 16 can be moved longitudinally to take up any wear.

20, 20 are two keys which secure one of the heads 5 of the drum 4 to the shaft. These keys extend through the clutch, as shown in Fig. 2, and secure the sliding clutch member 21 to the head so that the drum will turn with this clutch member, but the clutch member can slide longitudinally on the shaft to engage or release the clutch disks 22. These clutch disks are of the ordinary type, each alternate disk being secured to the clutch member 16 at its periphery and the other disks are connected to the shaft 1 by the keys 20 so that when the clutch section 21 is drawn back the disks are free, the sections secured to the member 16 rotating without turning the drum and the drum can be turned by uncoiling the electric cord without turning the driving gear. The disks are held in position in the clutch member 16 by a ring $16^a$ and bolts $16^b$.

Mounted between the hub 5 and the clutch member 21 is a coiled spring 23. In the present instance, the coiled spring is adapted to an annular recess in the clutch section 21 so that while it is of considerable length a comparatively small amount of room is occupied and it is protected by being located within the recessed portion of the head 6 of the drum. The clutch member 21 has a flange 24 and sliding on a portion of the clutch member is a brake ring 25 and between the brake ring and the flange is a steel washer 26. This brake ring is moved toward and from the flange 24 by lever mechanism which releases the clutch and applies the brake so that, when the drum is free of the driving mechanism, it is prevented from rotating unduly when the electric cord is drawn away from the drum. The lever mechanism, in the present instance, consists of two arms 27 mounted on a vertical rock shaft 28 having an operating arm 29 which is connected to any suitable rod extending to the driver's station on the locomotive. Each arm 27 is perforated and extending through the perforations is a pin 30 formed, in the present instance, integral with the brake ring 25.

Secured to the flange of the hub 5 at the opposite end of the reel from the clutch is a commutator ring 31. The ring is insulated from the hub by a disk 32 of insulating material and the bolts 33 are also insulated from the hub. 34 is the terminal for the wire which is coiled upon the reel and 35, 35 are the brushes secured to posts 36 which are attached to the bearing 3, being insulated, however, from said bearing. The brushes 35 are made of plates, bent as shown in Fig. 4, and having bearing shoes 37 thereon which rest against the commutator 31. The two posts are connected by a plate 38. 39 is a binding post for the wire leading to the generating apparatus on the locomotive. Other constructions of commutators may be used without departing from the main features of the invention.

In order to feed the cord properly on the reel, we provide a traveling guide 40, adapted to rods 41, and having a nut 42 which engages the threads of the double screw shaft 43 which is mounted in bearings 44 projecting from the main bearings 2 and 3. On the end of the screw shaft 43 is a sprocket wheel 45 around which passes a chain 46 from a sprocket wheel 47 on the shaft 1 so that, as the shaft 1 rotates, the guide will reciprocate in front of the drum. On the guide 40 is a block 48 having an eye 49 through which the electric cord passes. This block is secured to the slide by straps 50 adapted to grooves in the block and provided with nuts 51 so that the block is rigidly held to the guide, yet can be readily detached therefrom for renewal when it becomes worn.

The operation is as follows: The reel is usually located on the rear portion of an electric locomotive and as the locomotive travels in the completed galleries where the electric wires have been placed the reel is not used, but should the locomotive enter a gallery where the electric wires have not been located, then one end of the wire is hooked to the electric conductor in the main gallery and as the locomotive proceeds the operator releases the clutch and simultaneously applies the brake with the same lever so that while the cord will pull freely from the reel, the reel will not rotate faster than the removal of the cord, thus avoiding slack on the cord. When the locomotive has received its load and reverses its direction of movement, then it is necessary for the reel to be turned in the opposite direction and the wire, or electric cord, is coiled thereon. This is accomplished by shifting the lever and allowing the clutch to drive the drum. By providing a friction clutch for this purpose the first coil is wrapped upon the drum and there is practically no slip, but when the second coil is placed thereon there is a certain amount of slip, due to the increased diameter of the drum, and when the third coil is placed thereon there is considerably more slip. The spring back of one of the clutch members allows for this slip but is of sufficient strength to permit the cord to be tightly wound on the drum. As the cord is wound on the drum it is traversed backward and forward over the face of the drum so that it is wound evenly thereon. The reel, being assembled as a unit, can be applied to any mine locomotive and can be located at any point thereon as desired.

We claim:

1. The combination of a shaft; bearings therefor; driving mechanism; a clutch section loosely mounted on the shaft; means for adjusting the clutch section with respect to the driving gear; a second clutch section splined to the shaft but free to be moved longitudinally thereon; a spring bearing against the second clutch section, said second clutch section having a friction surface forming part of a brake; a brake ring mounted to turn freely on the second clutch section and having a friction surface alining with the friction surface of said section; and lever mechanism for moving the ring into frictional contact with the second clutch section and on the continued movement of the lever the said section will be drawn back against the pressure of its spring, releasing the clutch.

2. The combination of a shaft; clutch mechanism, said clutch mechanism consisting of two elements; disks mounted between said elements, one of said elements being arranged to slide on the shaft and the other being loose thereon; a spring at the back of the sliding element; a pinion on the hub of the other element; screws for adjusting said element; a driving shaft; bearings therefor; a gear wheel on the driving shaft meshing with the pinion; a brake ring arranged to bear against the sliding clutch member; and lever mechanism for moving the brake ring into and out of position, the brake ring being applied in advance of the release of the clutch.

FRANK B. DEANS.
BENJAMIN K. KIRK.

Copies of this patent may be obtained for five cents each, by addressing the "Commissioner of Patents, Washington, D. C."